2,773,842
Patented Dec. 11, 1956

2,773,842

HYDROFORMING CATALYSTS AND METHOD

Charles N. Kimberlin, Jr., and Elroy M. Gladrow, Baton Rouge, La., assignors to Esso Research and Engineering Company, a corporation of Delaware No Drawing. Application December 22, 1952,
Serial No. 327,409

6 Claims. (Cl. 252—455)

The present invention pertains to catalysts and particularly to the preparation of catalysts suitable for the reforming or hydroforming of lower boiling hydrocarbons or naphtha fractions into motor fuels of excellent anti-knock and engine cleanliness characteristics.

Hydroforming is a well known process for treating hydrocarbon fractions boiling within the motor fuel or naphtha range to upgrade the same or increase the aromaticity and improve the engine cleanliness and anti-knock characteristics of said fractions. It has been proposed to hydroform such lower boiling hydrocarbon fractions by treating them in the presence of hydrogen or hydrogen-rich recycle gas (i. e. at relatively high hydrogen partial pressure) at pressures of up to about 1000 lbs. per sq. inch at temperatures of about 750–1050° F. and in contact with such catalysts as molybdenum oxide, chromium oxide or in general oxides or sulfides of metals of groups IV–VIII of the periodic system of elements, alone, or generally supported or dispersed upon a base or spacing agent. Suitable materials for this purpose include activated alumina, alumina gel, and zinc aluminate spinel.

It is well known in several catalytic conversions of hydrocarbons that catalysts having the same chemical composition but prepared in different ways may differ widely in their ability to promote or catalyze certain reactions or hydrocarbon conversions. Previous experience with hydroforming catalysts has shown that the base or support exerts a strong influence on the ultimate catalyst behavior or activity of the catalyst. In view of the continued demand for greater volumes or yields of naphtha or motor fuels of higher anti-knock properties a great deal of research is in progress by many groups in an effort to find new or improved hydroforming techniques and new and better catalysts capable of giving higher yields and/or higher octane number products.

It is the object of this invention to prepare new and improved reforming or hydroforming catalysts.

It is also an object of this invention to prepare hydroforming catalyst supports which, when impregnated with an active catalytic component such as molybdenum oxide yield catalysts which give high yields of high octane number gasoline.

It is a further object of this invention to hydroform hydrocarbon fractions in contact with certain novel catalyst compositions to produce high octane number motor fuels in good yields.

These and other objects will appear more clearly from the detailed specification and claims which follow.

It has now been found that the structure of inorganic oxides can be altered to a substantial extent and their usefulness as supports for dehydrogenating components to form catalysts adapted for reforming or hydroforming can be enhanced by subjecting said hydrous inorganic oxides to elevated temperatures and pressures and then drying said oxides while at said elevated temperatures and pressures. Hydrous inorganic oxides which are treated in this manner undergo a moderate to substantial reduction in surface area and a substantial increase in pore volume as well as in pore diameter. While all of the gel materials examined to date are similar in their response to the pressure drying treatment with respect to the relatively large increase in pore volume which they undergo, the gels differ among themselves somewhat as regards the magnitude of the loss in surface area which they undergo. For example, alumina gel when subjected to the pressure drying treatment in accordance with this invention, undergoes relatively slight loss in surface area as compared with the same alumina dried at atmospheric pressure; on the other hand, silica-alumina co-gel comprising about 87% silica and 13% alumina when dried at a pressure of about 600 p. s. i. g. (pounds per square inch gauge) may have only about one-half of the surface area of a similar gel dried at atmospheric pressure. This reduction in surface area and increase in pore volume and pore diameter is achieved without adverse effect upon the attrition characteristics of the material. The surface area of the pressure treated material is relatively stable or well retained by the material as shown by the retention of a major proportion of the surface area of the pressure dried material even after steaming for 24 hours at 60 lbs. per sq. inch and at 1050° F. In addition to the changes effected in the gel structural properties, gels such as silica-alumina co-gel which in the dry state are characterized by having surface acidity suffer a reduction in this surface acidity upon pressure drying in accordance with the present invention. Impregnation of the pressure dried oxides with active dehydrogenating components yields catalysts which are particularly valuable for the reforming or hydroforming of petroleum fractions.

The present invention is applicable to a wide variety of hydrous inorganic oxides either in the form of gels or gelatinous precipitates, for example, alumina gel, silica gel, alumina-silica cogels containing from 10 to about 99 wt. percent $Al_2O_3$ and from 1 to about 90% $SiO_2$. Other hydrous inorganic oxide gels which may be modified by pressure drying include titania, magnesia, zinc-aluminate spinel, etc. Stabilized alumina comprising 0.5 to 5% by weight based on alumina of chromia, zirconia, or silica may also be employed. These materials may be treated in the form of hydrosols, hydrous precipitates, true hydrogels, or mixtures thereof. The hydrous oxides to be treated may comprise about 80 to 98% water. The preferred pH varies somewhat with the nature of the hydrous oxides employed; for example, with aluminas the pH may be in the range of about 4 to 6, with silicas or silica-alumina co-gels the pH may be in the range of about 3 to 9.

The pressure drying of the inorganic oxide gels or gelatinous precipitates may be effected at pressures of 15 to 1000 lbs. per sq. inch and at temperatures of about 212 to 550° F. The conditions for effecting the pressure drying of the hydrous inorganic oxide gels may be varied widely. The pressure (and temperature) of drying, the time of heating under pressure prior to commencing the drying, and the rate of drying are interrelated variables. In the case of alumina: (1) increasing the pressure (temperature) of drying has little effect upon surface area but causes a large increase in pore volume, (2) increased time of heating under pressure prior to commencing the removal of water causes little change in either pore volume or surface area, and (3) increasing the rate of drying under pressure has little effect on surface area, but causes a considerable increase in pore volume. In the case of silica or silica-alumina co-gels comprising a major proportion of silica: (1) increasing the pressure (temperature) of drying causes an increasingly greater loss of surface area and a large increase in pore volume, (2) increased time of heating under pressure prior to commencing the removal of water causes an increased loss in surface area but little effect upon pore volume, and (3) increased rate of drying under pressure causes a larger increase in pore volume but has little effect upon surface area. The pressure dried gels may comprise about 5 to 20% residual water; this may be removed by an activation by heating at atmospheric pressure at a temperature in the range of 800° F. to 1400° F. for about 1 to 24 hours.

The presssure dried inorganic oxides may be used as such as catalysts or adsorbents or they may be composited with an active catalytic component such as, for example, a group VI metal oxide such has molybdenum oxide, chromium oxide, tungsten oxide, or a group V metal oxide such as vanadium oxide, mixtures of these oxides or metal salts thereof such as calcium or cobalt molybdate or nickel chromate or the like. Preferred catalysts of this type contain about 5 to 15 wt. percent of molybdenum oxide or from about 10 to 40 wt. percent chromium oxide upon pressure dried alumina. Good reforming catalysts are also obtained by the incorporation of about 0.1 to 2.0 wt. percent platinum or about 0.5 to 5.0 wt. percent palladium or 2.0 to 10 wt. percent of nickel or cobalt upon pressure dried alumina. Small amounts of stabilizers and promoters such as ceria or other rare earth metal compounds, potassia or the like may also be included in the catalyst. The incorporation of the active catalytic component can be effected in any known or conventional manner. For example, molybdenum-oxide-containing catalysts can be prepared by mulling molybdenum oxide or a compound capable of yielding molybdenum oxide on heating such as ammonium molybdate with the pressure dried inorganic oxide gel such as alumina or alumina containing a stabilizing amount (0.5–5.0 wt. percent) of $SiO_2$. Molybdenum-oxide-containing catalysts may also be prepared by impregnation of the inorganic oxide gel with a solution of a molybdenum compound such as ammonium molybdate. The impregnation step may be conducted after the pressure drying step, or, if desired, the hydrous oxide gel may be impregnated prior to the pressure drying step. The resultant composite is ordinarily heated or calcined at temperatures of from 800–1400° F. to activate it prior to or during charging to the reactor vessel.

Catalysts prepared in this way are valuable for a variety of operations such as reforming of naphthas, isomerization of paraffins and/or naphthenes, desulfurization and hydrogenation of olefins, aromatics, aldehydes and the like.

In reforming or hydroforming, the feed stock can be a virgin naphtha, a cracked naphtha or the like having a boiling range of from about 125–450° F. or it may be a narrow boiling cut within this range. The reforming may be effected in a fixed or moving bed or in a fluidized solids reactor system at pressures from atmospheric to 1000 lbs. per sq. inch, preferably 200–750 lbs. per sq. inch and at temperatures of 800–1000° F., preferably 850–950° F. Hydrogen or hydrogen-rich recycle gas is charged to the reaction zone at the rate of from about 1000 to 10,000 cu. ft. per barrel of feed. The hydrogen-rich gas is ordinarily preheated to about 1100–1200° F. in order to supply heat to the reaction zone, the hydrogen also serving to minimize carbon formation. The space velocity or the weight in pounds of feed charged per hour per pound of catalyst in the reactor depends upon the age or activity level of the catalyst, the character of the feed stock and the desired octane number of the product and may vary from about 0.15 to about 1.5. Isomerization and desulfurization can be effected under the same pressure and hydrogen dilution conditions at somewhat lower temperatures, say at about 500 to about 800° F.

The following examples are illustrative of the present invention.

*Example 1*

A soda-free silica hydrosol is prepared in the following manner. A 40° Bé. commercial solution of water glass ($Na_2O.3.25SiO_2$) is diluted with about 11.5 times its own volume of water. The diluted solution is percolated through a column of acid regenerated Amberlite IR–120 cation exchange resin at a flow rate of about 1.35 gallons per minute per square foot cross sectional area of exchange column. The depth of the exchange column is about 4 feet. Amberlite IR–120 is a commercial cation exchange resin supplied by the Rohm and Haas Company of Philadelphia; this material is believed to be a polymeric condensation product of a phenol sulfonic acid and an aldehyde. However, other cation exchange resins may be employed such as sulfonated coal or sulfonated polystyrene, etc. After a total of about 26 gallons of dilute sodium silicate solution has been passed through the column per cubic foot of resin the flow is discontinued. The product comprises a soda-free silica hydrosol comprising about 3% silica. The exchange column is washed with about twice its volume of water and then treated with 5% sulfonic acid using about 5.5 gallons of 5% acid per cubic foot of resin. The acid treated resin is washed with water using about 15 gallons of water per cubic foot of resin. The exchange column is now ready for making more silica hydrosol.

An alumina hydrosol is prepared by the alcoholate method as follows. Fifty-four pounds of aluminum metal in the form of turnings are dissolved in about 123 gallons of a 50/50 mixture of mixed amyl alcohols and a petroleum naphtha boiling in the range of about 200–300° F. About 1/10 ounce of mercuric chloride is used as a catalyst for the reaction between the aluminum and the amyl alcohol. It is necessary to heat the mixture to start the reaction between the metal and the alcohol, but after the reaction is started, cooling is necessary. After the reaction is complete the solution of aluminum amylate is hydrolyzed by mixing with a solution of 4 gallons of acetic acid in about 396 gallons of water at a temperature of about 80° F. The hydrolyzed mixture is allowed to settle into an upper layer of regenerated amyl alcohol and petroleum naphtha and a lower layer of alumina sol. The latter is withdrawn and stripped of its small content of dissolved and entrained amyl alcohol and naphtha by blowing with steam. The resulting alumina hydrosol comprises about 3% alumina. The regenerated amyl alcohol and naphtha mixture is dried by distillation for re-use.

Individual streams of the alumina hydrosol and silica hydrosol are passed simultaneously into a zone of rapid and efficient mixing, such as the impeller zone of a centrifugal pump. The flow rate of the two streams are adjusted such that 6.7 volumes of the silica hydrosol are fed into the mixing zone per volume of alumina sol. The pH of the silica-alumina co-gel is adjusted to a value of 7.0 and the mixture is aged for two hours at 120° F. A portion of the mixed silica-alumina hydrogel is dried in a steam heated oven at about 250° F. and atmospheric pressure and activated by heating for 16 hours at 1000° F. This material has a surface area of 664 square meters per gram, a pore volume of 0.50 cc. per gram, a surface acidity of 0.26 milliequivalent per gram (determined by titration of the sample suspended in isooctane with n-butyl amine), and a Standard attrition rate of 5.0 percent per hour. This material comprises about 13% alumina and about 87% silica.

The Standard attrition rate is a measure of the tendency of the particles of a fluidized catalyst to disintegrate into smaller particles in use. A low attrition rate is desirable for a catalyst for use in a fluidized solids system. The apparatus for measuring the Standard attrition rate comprises essentially a settling chamber consisting of a vertical cylinder with conical ends opening at the top into a dust collecting filter and having a 0.07 inch diameter jet mounted at the bottom for the introduction of air. The cylindrical section has a diameter of 9 inches and a length of 6¾ inches; the upper conical section has a length of 6¾ inches; the lower conical section has a length of 16¼ inches. A 15 gram sample of the fluidizable catalyst to be tested is placed in the apparatus and subjected to a jet of air using a flow rate of 21 liters of air per minute for 5 hours. The fines produced are collected in the dust collecting filter and weighed at hourly intervals. The Standard attrition rate is the average hourly rate of fines collection during hours 2 to 5 expressed as weight percent of the original catalyst charge.

Example 2

A stainless steel autoclave is charged to one-half its volume with the mixed silica-alumina hydrogel prepared as described in Example 1. The autoclave is rapidly heated to a pressure of about 600 p. s. i. g. (490° F.); about 2 hours are required for heating up the autoclave. When the 600 p. s. i. g. pressure is reached water vapor from the system is released at such a rate as to allow for proper maintenance of pressure within the autoclave system. Water is so removed from the mixed hydrogel until the water content of the hydrogel is reduced from about 97% to about 15 percent. This period of drying requires about 4 hours. The autoclave is coiled and the discharged product is dried and activated for 16 hours at 1000° F. The resulting material has a surface area of 294 square meters per gram, a pore volume of 1.38 cc. per gram, and a surface acidity of 0.13 milliequivalents per gram. This silica-alumina co-gel is useful as an adsorbent or may be converted into a reforming catalyst by impregnation with a solution of chloroplatinic acid using about 0.8 ounces of chloroplatinic acid ($H_2PtCl_6$) dissolved in 3 quarts of water for each 10 pounds of silica-alumina co-gel. After impregnation the catalyst is re-dried at about 250° F. The catalyst is heated to 900° F. over a three hour period in an atmosphere of hydrogen to reduce the platinum to the free metal. This catalyst comprises 0.5% Pt on a base containing 13% $Al_2O_3$ and 87% $SiO_2$. The catalyst is employed in the form of 3/16 inch x 3/16 inch cylindrical pellets in a fixed catalyst bed operation for the hydrocracking of a heavy cycle oil. This heavy cycle oil was produced in a commercial fluid catalytic cracking unit employing commercial 13% alumina 87% silica catalyst with unit operation at about 50% conversion to products boiling below 400° F. The cycle oil has an initial boiling point of about 600° F., an A. P. I. gravity of 23.4°, an aniline point of 168° F. and a specific dispersion (F–C) of 197. In the hydrocracking operation employing the catalyst prepared as described in this example, the temperature is about 700° F., the pressure is about 750 p. s. i. g., about 10,000 cubic feet of feed hydrogen are added per barrel of heavy cycle oil feed, and the heavy cycle oil is fed at a rate of about one volume of heavy cycle oil per volume of catalyst per hour. The gasoline fraction of the liquid product (the liquid boiling below 400° F.) comprises about 24 volume percent of the heavy cycle oil feed and has an A. P. I. gravity of 34.6°. The liquid product boiling about 400° F. has an A. P. I. gravity of 28.5°, an aniline point of 168 and a specific dispersion (F–C) of 160.

Example 3

A stainless steel autoclave is charged to one-half its volume with the mixed silica-alumina hydrogel prepared as described in Example 1. The autoclave is rapidly heated to a pressure of about 600 p. s. i. g. (490° F.); about 2 hours are required for heating up the autoclave. Heating is continued to maintain the pressure in the system at 600 p. s. i. g. for 2 hours after which water vapor is released from the system at such a rate as to allow for maintaining the pressure at 600 p. s. i. g. within the autoclave during the drying process. The water is removed from the mixed hydrogel until the water content of the hydrogel is reduced from about 97% to about 15 percent. The drying period requires about 4 hours. The autoclave is cooled and the discharged product is dried and activated for 16 hours at 1000° F. This material has a surface area of 278 square meters per gram, a pore volume of 1.34 cc. per gram, a surface acidity of 0.07 milliequivalents per gram, and a Standard attrition rate of 4.3 percent per hour. This material comprises about 13% alumina and 87% silica.

Example 4

Aluminum amylate is prepared as described in Example 1. One hundred gallons of the aluminum amylate solution are added to 155 gallons of water at room temperature with mixing. The hydrolyzed slurry of alumina is allowed to settle into an upper layer of regenerated amyl alcohol and petroleum naphtha and a lower aqueous layer of hydrous alumina. The latter is withdrawn and stripped of its small content of dissolved and entrained amyl alcohol and naphtha by blowing with steam. The resulting hydrous alumina slurry comprises about 6% alumina. The regenerated amyl alcohol and naphtha mixture is dried by distillation for re-use.

A portion of the above hydrous alumina slurry is dried in a steam heated oven at about 250° F. and atmospheric pressure, and activated by heating for 6 hours at 1200° F. The resulting alumina has a surface area of about 150 square meters per gram and a pore volume of about 0.40 cc. per gram. X-ray examination shows that this alumina exists in the eta crystalline phase.[1] This alumina is converted into a hydroforming catalyst by impregnating with a solution of ammonium molybdate using about 1.35 pounds of ammonium molybdate dissolved in 2.5 quarts of water for each 10 pounds of alumina. After impregnation the catalyst is re-dried at 250° F. and reactivated 6 hours at 1200° F. This catalyst comprises about 10% molybdena and is designated catalyst "A."

Example 5

A portion of the hydrous alumina slurry comprising about 6% alumina prepared as described in Example 4 is added to a stainless steel autoclave to one-half its volume. The autoclave is rapidly heated to a pressure of about 600 p. s. i. g. (490° F.); about 2 hours are required for heating up the autoclave. When the 600 p. s. i. g. pressure is reached water vapor from the system is released at such a rate as to allow for proper maintenance of 600 p. s. i. g. pressure within the autoclave system. The drying operation is continued under about 600 p. s. i. g. pressure until the water content of the system in the autoclave is reduced from about 94% to about 5–20 percent. This period of drying requires about 4 hours. The autoclave is cooled and the pressure dried product is activated by heating for 6 hours at 1200° F. The resulting alumina has a surface area of 142 square meters per gram and a pore volume of about 0.78 cc. per gram. X-ray examination shows this alumina to be in the gamma crystalline phase. Experience has shown that the gamma phase of alumina bases is favorable for the production of hydroforming catalysts having good selectivity for the production of high yields of high octane number gasoline. This alumina gel is converted into a hydroforming catalyst by impregnation with a solution of ammonium molybdate using about 1.35 pounds of ammonium molybdate dissolved in 3 quarts of water for each 10 pounds of alumina. After impregnation the catalyst is re-dried at about 250° F. and re-activated 6 hours at 1200° F. This catalyst comprises about 10% molybdena and is designated catalyst "B."

Example 6

About 98 gallons of the hydrous alumina slurry com-

---

[1] (Stumpf et al have described the various crystalline phases of alumina: Ind. Eng. Chem., volume 42, pages 1398 et seq., July 1950.)

prising about 6% alumina prepared as described in Example 4 is thoroughly mixed with about 4 gallons of 3% silica hydrosol prepared as described in Example 1. A portion of this material is charged to a stainless steel autoclave to one-half of its capacity. The autoclave is rapidly heated to a pressure of about 600 p. s. i. g. (490° F.); about 2 hours are required for heating up the autoclave. When the 600 p. s. i. g. pressure is reached water vapor from the system is released at such a rate as to allow for proper maintenance of 600 p. s. i. g. pressure within the autoclave system. The drying operation is continued under about 600 p. s. i. g. pressure until the water content of the system in the autoclave is reduced from about 94.1% to about 5–20 percent. This period of drying requires about 4 hours. The autoclave is cooled and the pressure dried product is activated by heating for 6 hours at 1200° F. The resulting alumina, stabilized with about 2% silica, has a surface area of about 218 square meters per gram, a pore volume of about 0.93 cc. per gram and an X-ray pattern which shows the alumina to be in the gamma crystalline phase. This silica stabilized alumina is converted into a hydroforming catalyst by impregnation with a solution of ammonium molybdate using about 1.35 pounds of ammonium molybdate dissolved in 3 quarts of water for each 10 pounds of alumina. After impregnation the catalyst is re-dried at about 250° F. and re-activated 6 hours at 1200° F. This catalyst comprises about 10% molybdena and about 1.8% silica and is designated catalyst "C."

*Example 7*

Catalysts "A," "B," and "C," described in Examples 4, 5, and 6 respectively, are employed in the form of 3/16 inch x 3/16 inch cylindrical pellets in a fixed catalyst bed operation for the hydroforming of a 200° F. to 330° F. boiling range virgin naphtha from mixed Southeast and West Texas crudes. The conditions employed are 900° F. temperature, 200 p. s. i. g. pressure, using 1500 cubic feet of feed hydrogen per barrel of naphtha feed, and a naphtha feed rate of approximately one volume of naphtha per volume of catalyst per hour; slight adjustments are made in the feed rate in order to obtain a $C_6+$ product with each catalyst having an aniline point of 0° F. The yields of $C_6+$ products are shown in the tabulation below.

| Catalyst | "A" | "B" | "C" |
|---|---|---|---|
| Aniline Point of $C_6+$ Product, °F | 0 | 0 | 0 |
| Yield of $C_6+$ Product, Vol. percent | 65.1 | 68.7 | 68.0 |

The foregoing description contains a limited number of embodiments of the present invention. It will be understood, however, that numerous variations are possible without departing from the scope of the following claims.

What is claimed is:

1. A catalyst manufacturing process which comprises subjecting hydrous aluminum oxide in the absence of extraneous water in a reaction zone to an elevated pressure in the range of 15 to 1000 p. s. i. g. and a temperature in the range of 212° to 550° F., and drying said aluminum oxide by releasing steam from said reaction zone while maintaining said elevated pressure whereby a catalyst of substantially increased pore volume and diameter is obtained.

2. The process of claim 1 wherein said elevated pressure is about 600 p. s. i. g. and said temperature is about 490° F.

3. The process of claim 1 wherein said hydrous aluminum oxide contains added silica.

4. The process of claim 1 wherein said hydrous aluminum oxide comprises alumina gel.

5. A catalyst manufacturing process which comprises subjecting a hydrous alumina-silica cogel in the absence of extraneous water to an elevated pressure in the range of 15 to 1000 p. s. i. g. and a temperature of 212° to 550° F. in a reaction zone, and drying said cogel to a water content in the range of 5 to 20% by releasing steam from said reaction zone while maintaining said cogel under said elevated pressure, and depressuring and activating the dried cogel.

6. The process of claim 5 wherein said elevated pressure is about 600 p. s. i. g. and said temperature is about 490° F.

References Cited in the file of this patent

UNITED STATES PATENTS

| | | |
|---|---|---|
| 1,772,055 | Miller et al. | Aug. 5, 1930 |
| 2,345,600 | Heard et al. | Apr. 4, 1944 |
| 2,358,202 | Behrman | Sept. 12, 1944 |
| 2,371,237 | Heard et al. | Mar. 13, 1945 |
| 2,447,016 | Kearby | Aug. 17, 1948 |
| 2,464,539 | Voorhies et al. | Mar. 15, 1949 |
| 2,550,531 | Ciapetta | Apr. 24, 1951 |
| 2,698,305 | Plank et al. | Dec. 28, 1954 |